Feb. 1, 1944.  R. L. SMIRL  2,340,494
FLUID COUPLING
Filed April 23, 1941
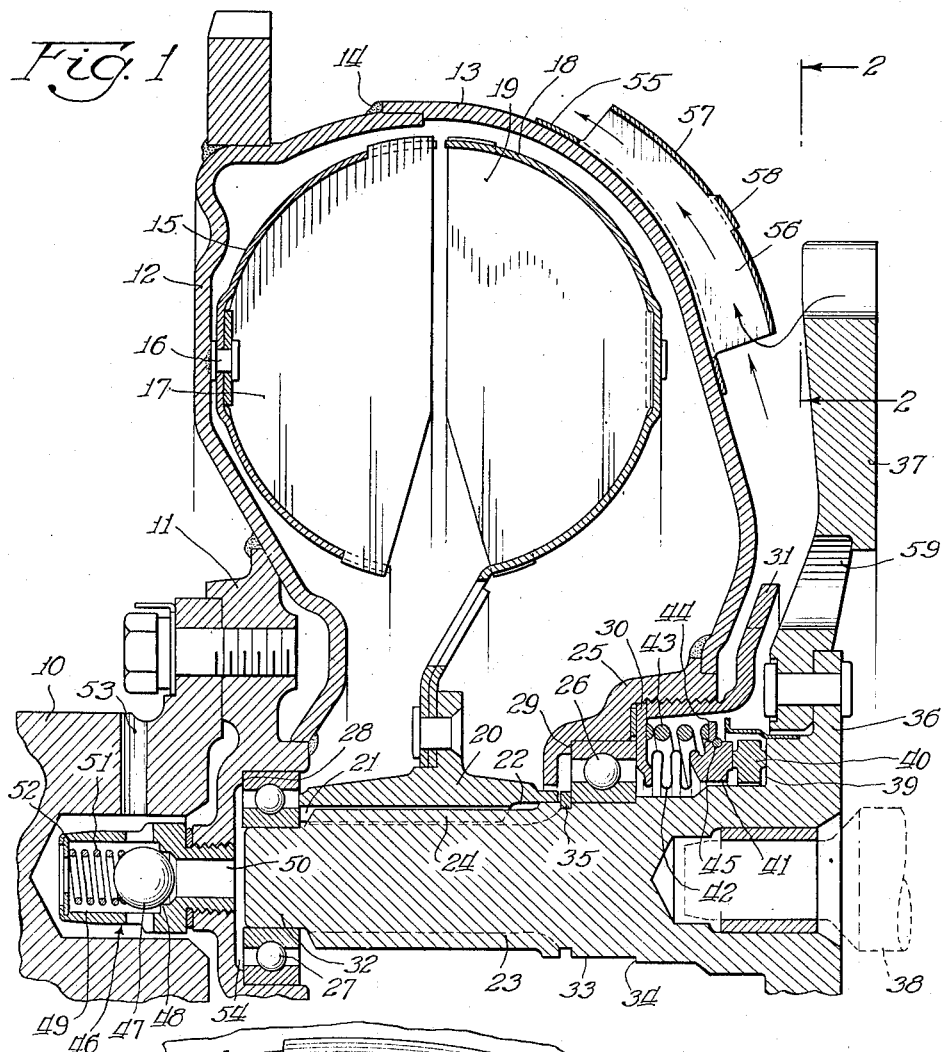
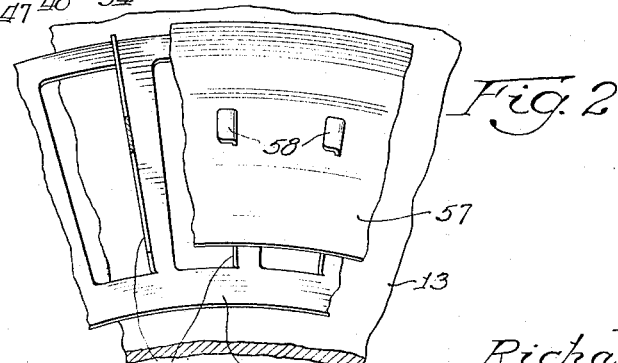
Inventor:
Richard L. Smirl
By Edward C. Fitzhaugh
Atty.

Patented Feb. 1, 1944

2,340,494

UNITED STATES PATENT OFFICE 2,340,494

FLUID COUPLING

Richard L. Smirl, Bellwood, Ill., assignor to Borg-Warner Corporation, Chicago, Ill., a corporation of Illinois Application April 23, 1941, Serial No. 389,959

6 Claims. (Cl. 60—54)

This invention relates to an improved hydraulic coupling of the vaned type.

The principal object of this invention is to provide an improved hydraulic coupling which is so constructed as to permit all members of the seal and the main bearing and shaft thereof to be readily inspected and repaired.

Another object is to provide an improved cooling means for the coupling.

Another object is to provide a pressure relief valve in combination with a pressure relief means incorporated in the seal for the coupling, the first pressure relief valve being used to safeguard the seal and to prevent loss of fluid.

These and other objects of the invention will become apparent from the following description when taken together with the accompanying drawing which forms a part of the description and in which:

Fig. 1 is a fragmentary side elevation in section of the improved coupling; and

Fig. 2 is a fragmentary front elevation of the improved cooling means for the coupling.

Referring now to the drawing for a detailed description of the invention, 10 is a drive shaft to which is bolted a casting 11 which serves to support the coupling and also to transmit the drive from the shaft thereto. The coupling is provided with two stamped sheet metal shells 12 and 13 which are welded together at 14 to form a toroidal container or housing. An inner shell 15 is welded to outer shell 12 by spot welds located on rivets 16, the latter being used to hold individual vanes 17 in place in shell 15. Vanes 17 and shell 15 together constitute the driving element of the fluid coupling.

The driven element of the coupling is comprised of a stamped inner shell 18 to which is secured a plurality of vanes 19, inner shell 18 forming with shell 15 of the driving element a torus within which the working hydraulic circuit is formed. Shell 18 is riveted to a forged hub member 20 which has splines 21 formed on the inside thereof. Said splines 21 terminate a short distance from the right-hand end (Fig. 1) of the hub as shown at 22. Within hub 20 is an intermediate shaft 23 which has external splines 24 cooperating with splines 21 of hub member 20 to receive the drive therefrom.

Outer shell 13 is welded to a forging 25 which extends inwardly to form a support for a bearing 26. Forging 11 on drive shaft 10 also supports a bearing 27 which with bearing 26, cradles shaft 23 for rotation with respect to drive shaft 10. It will be noted that bearing 27 is prevented from moving toward drive shaft 10 by means of a shoulder 28 in forging 11, and bearing 26 is prevented from moving in the same direction by means of a shoulder 29 in forging 25. Movement of bearing 26 in the opposite direction is prevented by means of a washer 30 which is held in place by a nut 31 threaded into forging 25.

Intermediate shaft 23 is supported from bearing 27 at its driving shaft end 32, the end being turned down to fit snugly into the bearing. A step 33 is provided in shaft 23 to receive bearing 26, the bearing being retained between the shoulder 34 formed by the step and a snap ring 35. Hub member 20 of the driven element of the coupling fits with very slight clearance between snap ring 35 and bearing 27.

It will be apparent thus far that when shaft 23 is removed from the coupling, bearing 27 and hub 20 need not move with it, but bearing 26 must be withdrawn with the shaft.

Intermediate shaft 23 is formed with a flange 36 to which is riveted or otherwise secured a plate 37 for driving a friction clutch (not shown) or other disconnectible coupling. The drive is transferred utimately through the disconnectible coupling to a driven shaft 38 shown dotted as piloted in intermediate shaft 23. One face 39 of flange 36 is hardened and polished and cooperates with a floating ring 40 to form a fluid-tight seal for the coupling. Said ring 40 is urged against hardened face 39 by a somewhat similar hardened and polished ring 41 which in turn is connected by means of a fluid-tight bellows 42 with washer 30. A spring 43 bears against washer 30 on one side and against a second washer 44 on the other side which is retained by a snap ring 45 on ring 41 and transmits the thrust of the spring to ring 41.

The space between nut 31 and plate 37 is made considerably smaller than the length of the thread on nut 31. When nut 31 is backed out, therefore, it strikes plate 37 before it is fully withdrawn, and in order to complete the withdrawal the plate must be turned with the nut. This causes the associated shaft 23 to be withdrawn along with the nut and since bearing 26 is locked on shaft 23 against axial movement with respect thereto, the bearing will also be pulled from housing 13. When the bearing is withdrawn, snap ring 35 may be removed and the bearing and seal may likewise be removed. In this manner all members of the seal may be removed, inspected and replaced without damage to the coupling.

It will be observed that the seal just described is so constructed that when an excessive pressure is reached within the coupling the seal will open to relieve the pressure. It is desirable when relieving the pressure merely to permit the vapor to escape without losing any of the fluid. It has been found however, that despite the rather small diameter of the seal, a certain amount of fluid will also escape when the seal opens. This, of course, is unsatisfactory since the coupling is designed to operate with a predetermined amount of fluid therein and any change in this amount will change the characteristics of the coupling. In addition, it has been found that the relief pressure cannot be controlled accurately since the bellows 42 has a high rate and is difficult to calibrate. Furthermore, when the seal opens it is quite likely to pass dirt particles therethrough, some of which may become lodged between the polished surfaces of the rings and thereafter score these surfaces and substantially decrease the effectiveness of the seal. For the foregoing reasons it becomes undesirable to use this seal as a pressure relief means and accordingly this invention contemplates the provision of a relief valve which will take over this function whenever necessary.

The relief valve is shown at 46 and comprises a ball 47 which is seated on a shoulder 48 formed by an enlargement 49 of a passageway 50 in the central portion of casting 11. The ball 47 is urged against the seat by a spring 51 which is retained within the enlargement 49 by a snap ring 52. The passageway 49 is in communication with a passageway 53 in shaft 10 to allow the vapor to escape into the crank case. The valve is located at the axis of rotation of the coupling so that the likelihood of fluid escaping is reduced to a minimum. Passageway 50 communicates with the fluid in the housing by means of a space 54 between the end 32 of shaft 23 and forging 11 and the opening provided by bearing 27.

With the arrangement just described, the seal at flange 36 may be arranged to relieve pressure at a much higher value than has heretofore been possible and valve 46 may be set to open at the predetermined optimum value, the latter being very accurate in its operations and precluding the necessity of the former even operating. This of course prevents the loss of fluid and also the scouring both of which are detrimental to the operation of the coupling.

Since a certain amount of slip is always present in a fluid coupling, some heat is generated which must be dissipated. The usual means employed to effect this dissipation of heat comprises a plurality of vanes secured to the outside of the fluid coupling housing so as to rotate therewith and thus form a fan or blower. It has been found however, that unless the vanes are made very large, the capacity of the fan will not be sufficient to cool the coupling to the extent desired. This is particularly true where the vanes are located on a sloping or curved portion of the housing and are not strictly radial.

To obviate the foregoing difficulty the construction shown in Fig. 2 and in the upper right hand portion of Fig. 1 is used. This consists of a stamped plate 55 having vanes 56 extruded therefrom, the vanes lying in radial planes and the plate being welded to the housing 13. A shroud 57 is provided which covers vanes 56 in such a way as to leave exposed the ends of the vanes. The shroud may be secured to the vanes by providing the vanes with tabs 58 which pass through apertures in shroud 57 and are then folded over. In operation, the air is drawn in at the radially inner end of the vanes and expelled at the radially outer end in the direction shown by the arrows. It will be noted that shroud 57 directs the air over the curved or sloping surface of the housing and causes it to be expelled in a forward direction tangentially of the surface, thereby increasing the efficiency of the fan and permitting more heat to be extracted per unit volume of air handled.

To insure an adequate supply of air to the cooling vanes a plurality of openings 59 is provided in plate 37. These openings serve also as a means for inserting a tool through the plate to nut 31 in order that the nut may be turned. The air will be drawn in from the openings and from around the edge of the plate.

It is understood that the foregoing description is merely illustrative of a preferred embodiment of the invention and that the scope of the invention therefore is not to be limited thereto but is to be determined by the appended claims.

I claim:

1. In combination, a hydraulic coupling having driving and driven vaned elements, a driving shaft, a housing surrounding the elements and transmitting the drive from the drive shaft to the driving element, an intermediate shaft, a bearing in proximity to the drive shaft and supporting the forward end of the intermediate shaft, a flange on the opposite end of the intermediate shaft, a bearing in the rear of the housing for supporting the shaft intermediate the flange and first-mentioned bearing, means for restraining the rear bearing from axial movement relative to the intermediate shaft, a hub for supporting the driven element of the coupling, said hub being located between the bearings and having a driving connection with the intermediate shaft, a seal located outside the housing between the rear bearing and flange, a washer for retaining the rear bearing in the housing, and a nut threaded in the housing for holding the washer in place, said nut when withdrawn acting against the flange to withdraw the shaft and rear bearing from the housing.

2. A combination as described in claim 1, and including a plate secured to the flange, said plate having apertures in proximity to and in alignment with the edge region of the nut through which the nut can be reached.

3. A combination as described in claim 1, including cooling vanes on the housing, and a plate secured to the flange, said plate having apertures in proximity to and in alignment with the edge region of the nut to admit a tool for operating the nut and additionally to admit air to the inner ends of the cooling vanes.

4. In combination a hydraulic coupling having driving and driven vaned elements, a driving shaft, a plate, a housing surrounding the elements and transmitting the drive from the drive shaft to the driving element, an intermediate shaft, a bearing in proximity to the drive shaft and supporting the forward end of the intermediate shaft, a flange on the opposite end of the intermediate shaft, means connecting the flange and plate for rotation together, a bearing in the rear of the housing for supporting the intermediate shaft between the flange and first-mentioned bearing, a shoulder and a snap ring on the shaft for restraining the rear bearing from axial movement relative to the shaft, a hub for supporting the driven element of the coupling, said hub having a splined connection with the intermediate shaft and being retained between the snap ring and forward bearing, a washer for retaining the rear bearing in the housing, a nut threaded in the housing for holding the washer in place, said nut when withdrawn acting against the plate and intermediate shaft to withdraw the shaft and rear bearing from the housing, and a seal between the flange and rear bearing, said seal including the washer.

5. A combination as described in claim 4, including cooling vanes on the housing, and a shroud rotatable with the housing and adapted to direct cooling air over the housing, said plate having apertures which serve to admit cooling air to the inner ends of the vanes and also to give access to the nut.

6. In combination a hydraulic coupling, a plate, an intermediate shaft connecting the coupling and plate, a housing for the coupling, a bearing support for the shaft located in the housing, means for preventing the bearing from moving axially relative to the shaft, and a nut threaded on the housing for holding the bearing against axial movement with respect to the housing, said nut when moved along its thread in a direction to loosen the nut acting against the plate to pull the shaft and bearing out of the housing.

RICHARD L. SMIRL.